Figure 3:
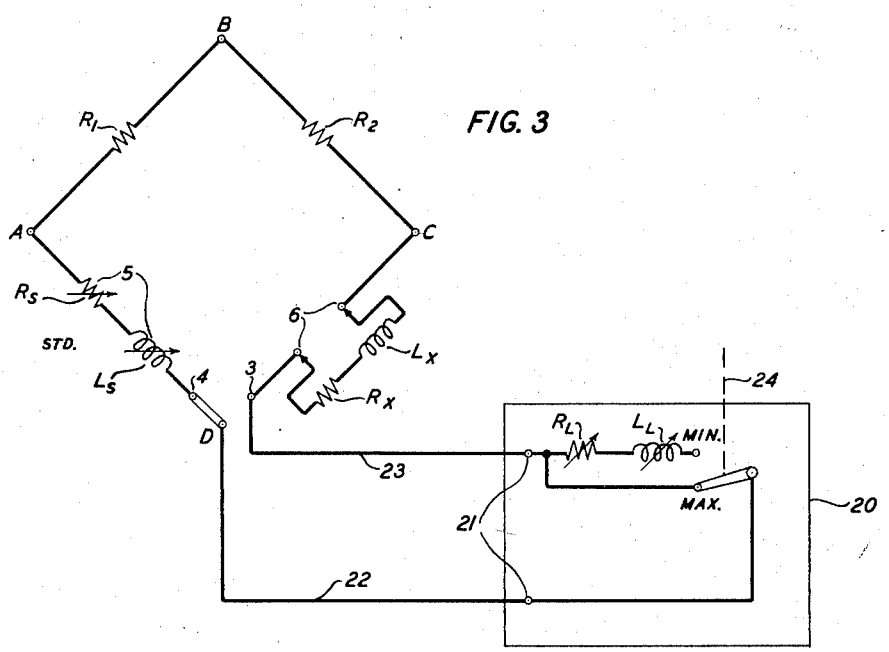

Nov. 20, 1951     B. M. WOJCIECHOWSKI     2,576,059
LIMIT BRIDGE DETECTOR
Filed Oct. 29, 1947     2 SHEETS—SHEET 1
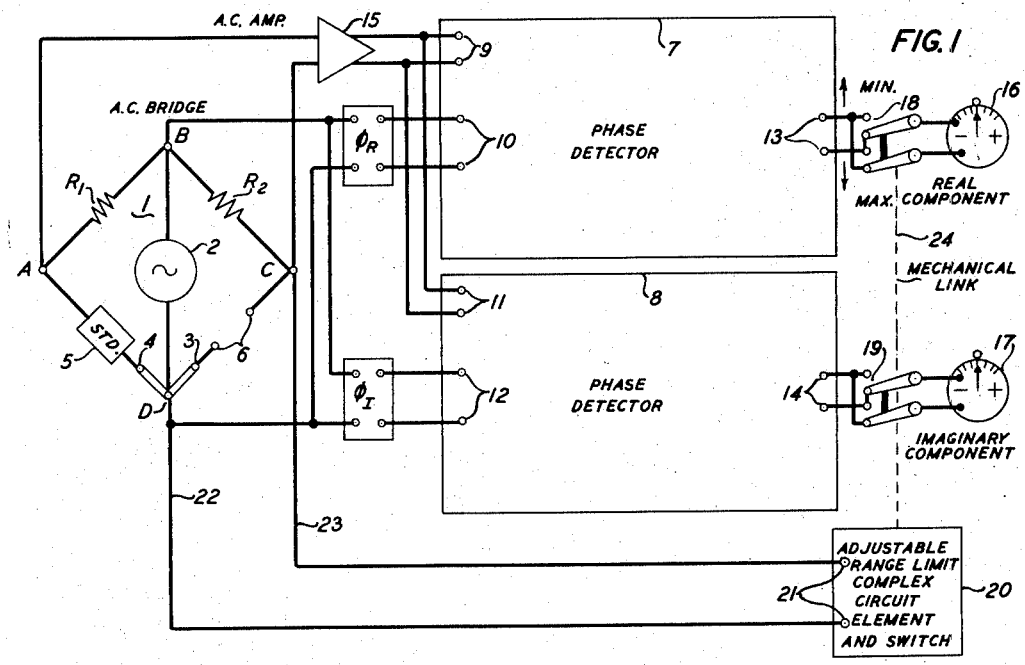
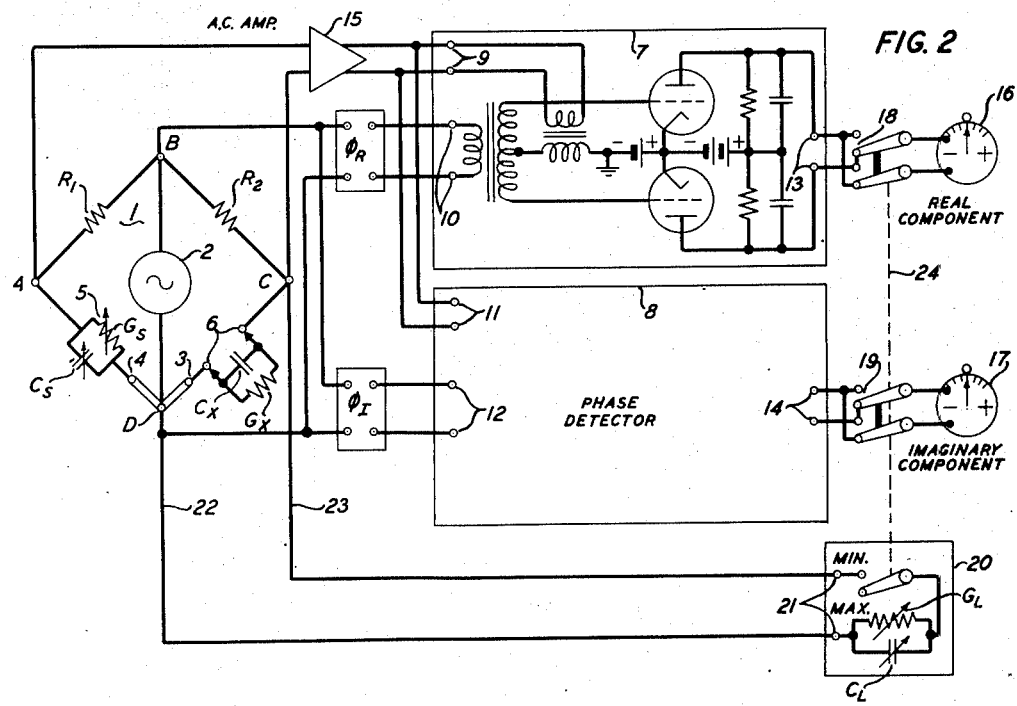
INVENTOR
B.M. WOJCIECHOWSKI
BY Walter M. Thiel
ATTORNEY Nov. 20, 1951  B. M. WOJCIECHOWSKI  2,576,059
LIMIT BRIDGE DETECTOR Filed Oct. 29, 1947  2 SHEETS—SHEET 2

INVENTOR
B.M. WOJCIECHOWSKI
BY
Walter M. Hiel
ATTORNEY

Patented Nov. 20, 1951

2,576,059

UNITED STATES PATENT OFFICE 2,576,059

LIMIT BRIDGE DETECTOR

Bogumil M. Wojciechowski, New York, N. Y., assignor to Western Electric Company, Incorporated, New York, N. Y., a corporation of New York Application October 29, 1947, Serial No. 782,860

7 Claims. (Cl. 175—183)

This invention relates to testing systems and more particularly to a system adapted for production testing of a complex circuit element.

Alternating current bridges utilizing phase-sensitive or phase-discriminating detectors capable of responding independently to the real and imaginary components of a complex circuit element (impedance or admittance) have been known for some time. Examples of such bridges are disclosed in United States Patent 1,475,240, granted November 27, 1923 to Osborne, United States Patent 1,496,786, granted June 10, 1924 to Shackelton, United States Patent 1,660,405, granted February 28, 1928 to Affel, and United States Patent 1,919,284, granted July 25, 1933 to Walter.

In production testing a large quantity of similar circuit elements of the same nominal size, it is unimportant to know the exact value of each circuit element. It is, however, important to know whether or not the circuit element tested is within prescribed limits. One of the customary ways of accomplishing this objective has been to balance the measuring bridge at the nominal value of the circuit elements under test and to inscribe maximum and minimum limits on the balance indicator. This customary practice however, has usually been applied to single component circuit elements, for example resistance elements tested on direct current bridges. The problem becomes considerably more complicated when complex circuit elements having more than one component are being tested. Also inherent disadvantages with resulting inaccuracies have prevented any general use of this practice wherever either close or precise limits have been specified and must be maintained. These disadvantages are first, that the deflection depends upon the gain of the amplifier used for amplifying the unbalanced output voltage of the bridge and upon any variation in the power supply voltage supplied to the bridge. A second disadvantage is that the setting of limits on the scale of the balance indicator lacks precision even with no variation in power supply voltage or amplifier gain mainly because balance is simultaneously dependent upon both of the complex components. The third and very practical disadvantage is that in view of the first two disadvantages the test procedure requires an excessive amount of attention from the operator.

It is the object of this invention to completely overcome the aforementioned disadvantages by providing an apparatus which reduces the testing operation to the simple procedure of merely connecting the complex circuit element to the bridge circuit, operating a two-position switch and observing the direction of deflection of two indicators. It is a further object of this invention to provide means whereby this simple testing procedure immediately gives all the necessary information as to the character of the defect of a circuit element which fails to pass the prescribed requirements.

The foregoing objects are achieved by this invention which provides in combination with an alternating current bridge having input and output terminals, two phase-sensitive detectors each having an input circuit connected to the bridge output terminals, a source of alternating current connected to the bridge input terminals and a separate zero-center-reading indicator connected to the output circuit of each phase detector through a reversing switch. A second input circuit for each phase detector, each including a phase control means, is connected to the source of alternating current supplied to the bridge. An adjustable range limit complex circuit element is connected in one arm of the bridge, and a switch connected to said adjustable element changes the magnitude of its components between two predetermined limits whereby the two indicators can be made to give indications in one direction for all complex circuit elements under test whose components are within prescribed limits and an opposite indication for any component lying outside the prescribed limits.

Figure 4:
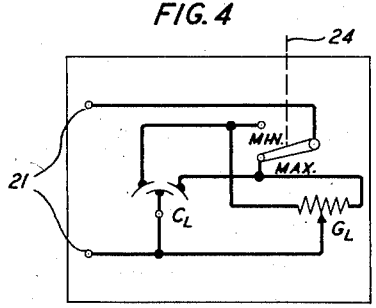
Figure 5:
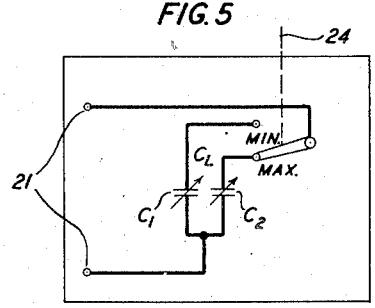
Figure 6:
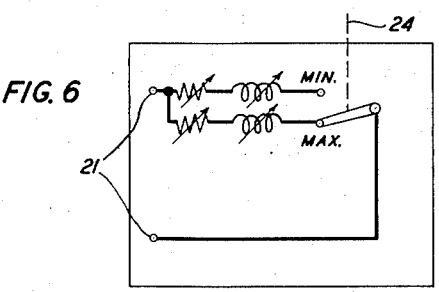

The invention may be better understood by referring to the accompanying drawings, in which:

Fig. 1 is a schematic showing the essential elements comprising an embodiment of this invention;

Fig. 2 discloses an embodiment of this invention as applied to a comparison type admittance bridge and showing a preferred form of phase detector;

Fig. 3 discloses the circuit changes for Figs. 1 and 2 when the invention is applied to a comparison type inductance bridge; and Figs. 4, 5 and 6 disclose various alternative arrangements for the adjustable range limit complex circuit elements which are especially adaptable for setting close limits, particularly where the changes in components are of the same order or less in magnitude than those of the residual admittances or impedances of the range limit elements themselves.

Referring now more particularly to Fig. 1 where is shown a schematic of the combination comprising the necessary elements for the practice of this invention, it will be noted that the bridge 1 is generally referred to in the art as of the "comparison" type and may be used either as an admittance or as an impedance bridge. The bridge has four terminals A, B, C and D, the terminals A and C comprising the output terminals and the terminals B and D comprising the input terminals. Alternating current power is supplied to the input terminals B and D from an alternating current source 2. The ratio arms of the bridge comprise resistors R1 and R2 which are preferably, but obviously not necessarily, made equal. The AD arm of the bridge is used as the standard arm and contains an adjustable standard complex circuit element 5. In the CD arm of the bridge is found the test terminals 6 to which may be connected the complex circuit element under test. This arm of the bridge may be referred to as the measuring arm whereas the AD arm of the bridge may be referred to as the standard arm. Terminals 3 and 4 are found, respectively, in the measuring and standard arms of the bridge, and are connected to the D terminal of the bridge by means of removable links as shown in Fig. 1. The purpose of these links will be more particularly described later.

Two phase detectors 7 and 8 are provided for observing the real and imaginary components, respectively, of the unbalanced output voltage of the bridge. It will be noted that each of these phase detectors has two pairs of input terminals and one pair of output terminals. For example, the phase detector 7 has alternating current input terminals 9 and 10 and direct current output terminals 13 whereas phase detector 8 has alternating current input terminals 11 and 12 and direct current output terminals 14. This general arrangement of input and output terminals for phase detectors is in common with substantially all phase detectors and although most any phase detector may be used in the practice of this invention, a preferred form is disclosed in Fig. 2.

The unbalanced output from the alternating current bridge is preferably amplified by a suitable alternating current amplifier 15 and applied to terminals 9 and 11 of the two phase detectors. The other input terminals 10 and 12 of the phase detectors are connected to the alternating current supply source 2 through suitable phase control networks $\phi_R$ and $\phi_I$. These phase control networks may be of any conventional form. Phase control network $\phi_R$ adjusts the phase relation of the two input voltages to phase detector 7 so that the voltage supplied to terminal 10 is substantially in phase with the real component of the bridge output voltage as it appears at terminals 9 of the phase detector 7. In this way the indicator 16 is, within certain limits, rendered sensitive only to variations in the real component of the complex circuit element under test and substantially insensitive to any variations of its imaginary component. This property of phase detectors is well known and requires no further description.

The phase control network $\phi_I$, connected to terminals 12 of phase detector 8, is adjusted in a similar manner so that indicator 17 is similarly responsive only to variations in the imaginary component of the complex circuit element under test. It, therefore, necessarily follows that the voltages applied to terminals 10 and 12 will differ by substantially 90 degrees.

The two indicating devices 16 and 17 may be zero-center-reading D'Arsonval type galvanometers and are connected to their respective phase detector output terminals 13 and 14 through reversing switches 18 and 19.

Block 20 of Fig. 1 refers to an adjustable complex circuit element and switch arranged to change the magnitudes of the two components of this circuit element. The nature of this circuit element will be described in greater particularity in connection with the remaining figures but for the purpose of the description of Fig. 1 it may be stated that terminals 21 are connected to either the standard or the measuring bridge arm through conductors 22 and 23. As shown in Fig. 1, conductor 22 is connected to the D terminal of the bridge whereas conductor 23 is connected to the C terminal of the bridge, thereby connecting terminals 21 to the measuring arm. With this connection, it is assumed that the bridge is arranged for measuring admittances and the complex circuit element in block 20 is thereby arranged for addition to the complex circuit element under test. The switch in block 20 is arranged to change the magnitude of both components of this adjustable complex circuit element and for convenience this switch is mechanically linked through a linkage 24 to the two reversing switches 18 and 19.

It will become evident as the description of this invention proceeds further that the adjustable complex circuit element not only may be connected across the CD arm of the bridge but, in the alternative, it may be connected across the AD arm of the bridge. Also, if the complex circuit element in block 20 is in the form of a complex impedance and the alternating current bridge is arranged for measuring impedances instead of admittances, connection 23 may be removed from terminal C and connected to terminal 3 and the link interconnecting terminal 3 and the D terminal of the bridge removed. This change in connections is obvious when it is remembered that admittances are added in parallel and impedances are added in series.

It is also evident that instead of making the connection of conductor 23 to terminal 3, it may be connected to terminal 4 and the link interconnecting terminal 4 and the D terminal of the bridge removed.

In using the arrangement of Fig. 1, it is assumed that the bridge has been given its preliminary balance in accordance with conventional methods. This is usually done by setting the standard to zero and, without any complex element connected to the test terminals, various trimmers (not shown in Fig. 1) are adjusted until the bridge shows a complete balance for both components. In making these adjustments the adjustable complex circuit element in block 20 must also be disconnected from the bridge. The adjustable complex element in block 20 is thereafter again connected to the bridge and both components thereof adjusted to equal the maximum range of deviation which will be permitted of the complex element to be tested. The two components of the standard are adjusted to read the maximum values of the two components to be measured. Now it is assumed that with the switches 18 and 19 in the "min." position, the two galvanometers 16 and 17 are so connected to their phase detectors that they will each give a positive deflection when the two standard components are each less than the corresponding components in arm CD of the bridge including, of course, the adjustable complex circuit element in block 20. This completes the adjustments of the circuit and it is now ready for production testing of a large number of similar complex circuit elements.

The testing operation is performed by simply connecting the complex circuit element to the test terminals 6 of the bridge, then operating the two reversing switches 18 and 19, first to their upper ("min.") position and then to their lower ("max.") position, while at the same time operating the switch in block 20 so that the components thereof added to the bridge arm are larger in the first position than in the second position. Preferably this operation of these three switches is accomplished simultaneously by means of the mechanical linkage 24 shown in Fig. 1. The use of such a linkage is not only convenient but also precludes mistakes and simplifies the operation of the bridge. If the deflection of both galvanometers is positive for each of the two positions of the switches, each of the components of the circuit element under test lie within the prescribed limits. If in either position of the switches, one or the other indicator shows a negative deflection, the component associated with that indicator is outside of the prescribed limits. One position of the switches corresponds to the maximum limits and the other to the minimum limits, as will be hereinafter more particularly described. Therefore, the position of the switch itself will indicate whether or not the component is outside the maximum limit or outside the minimum limit.

It will thus be apparent that by the simple connection of the complex admittance to the test terminals of the bridge and the operation of the switches to their maximum and minimum limits respectively, all the information is obtained regarding which component, if any, is outside of the prescribed limits and whether or not it is outside the maximum or outside the minimum limits. It will also be evident that variations in voltage supply of source 2 or gain of amplifier 15 has no effect on the determination as to whether or not the components are within their prescribed limits. This is because it is immaterial how much deflection is observed since it is only the direction of the deflection which determines whether or not the components are within the prescribed limits.

Referring now to Fig. 2, where is shown a conventional type of admittance bridge embodying the principles of this invention. In this figure all the circuit components identical with or corresponding with those shown in Fig. 1 bear the same reference numerals. It will be noted that the standard 5 comprises a conductance standard Gs in parallel with a capacitance standard Cs and it will be recognized that this constitutes a standard complex admittance. This arrangement is especially useful in measuring capacitive admittance and one such admittance to be tested is shown connected to terminals 6 and comprises a capacitance Cx and conductance Gx.

While the phase detectors may be of any conventional form, a preferred form is shown in the block 7. This detector will be recognized as of the same type as disclosed in United States Patent 1,449,382, granted March 27, 1923 to Carson.

The same type of detector will also be found in United States Patent 1,596,942, granted August 24, 1926 to Nyquist and Etheridge and in United States Patent 1,660,405, granted February 28, 1928 to Affel. Briefly, it comprises two pairs of alternating current input terminals 9 and 10 connected to the input circuits of a pair of balanced vacuum tubes acting as plate rectifiers. The differential direct current output is applied through the direct current output terminals 13 to the direct current meter 16. The circuits in block 8 have not been shown but may be identical with those in block 7. As in Fig. 1 it will be noted that the reversing switches 18 and 19 are mechanically coupled through a link 24 to the range limit switch in block 20.

While a mode of operation has already been described for Fig. 1 and also applies to Fig. 2, another description specific to Fig. 2 will help fix the idea clearly in mind.

To set up the bridge, a preliminary balance should first be made by conventional means. With respect to the circuit specifically shown in Fig. 2, this is accomplished by removing the admittance under test from test terminals 6. The switches are then operated to "max." position, as shown in block 20. This will disconnect the range limit admittance from across the D and C terminals. The standard admittance 5 should have both of its components set to zero and the bridge is given its initial balance by adjusting trimmers, not shown in Fig. 2 but conventional with all bridges, until the two galvanometers 16 and 17 both read zero. A known admittance of the size to be measured is then connected to the test terminals 6 and the standard components Gs and Cs adjusted to equal its known components, so that both galvanometers will still read zero. The standard conductance Gs should then be moved slightly to unbalance the real component of admittance. Only galvanometer 16 should show a deflection when this conductance is increased. If galvanometer 17 produces any deflection, the phase shifting network $\Phi_I$ should be adjusted until galvanometer 17 reads zero for all changes of the conductance standard. Also the phase control network $\Phi_R$ should be adjusted to give maximum deflection of galvanometer 16. For the purpose of these adjustments the direction of these deflections is immaterial. The conductance standard Gs is then returned to the balance point and the capacitance Cs is changed slightly to unbalance the imaginary component of admittance. In this case the galvanometer 17 should be deflected and no deflection should be observed in galvanometer 16. Should any deflection be noted on galvanometer 16, the phase control network $\Phi_R$ should be slightly readjusted to bring it to zero for all values of capacitance Cs. It will then be noted that, within reasonable limits, galvanometer 16 is responsive only to variations in the real component of admittance and galvanometer 17 is responsive only to variations in the imaginary component of admittance.

The known admittance should then be disconnected from the test terminals 6 and the switch control adjusted to its "min." position as shown in block 20. This connects the range limit complex admittance across the CD arm of the bridge. If the two components $G_L$ and $C_L$ of this complex admittance are calibrated, they may be directly adjusted without comparison with the bridge standard 5. If not calibrated, they may be independently adjusted by setting the bridge standard 5 to the maximum range of deviation of each component permitted by the requirements and balancing the bridge by adjusting $G_L$ and $C_L$. Assume, for example, that a large number of 100 micromicrofarad condensers are to be tested and that the tolerance limits are given as ±5 per cent of the nominal value of the capacitance. This, of course, means that all capacitors between 95 micromicrofarads and 105 micromicrofarads are within the specified limits and are acceptable, while any capacitors with a capacitance less than 95 micromicrofarads or greater than 105 micromicrofarads are outside of tolerance limits. The permissible range of deviation is, of course, 10 micromicrofarads. Therefore, the capacitance component of the adjustable complex admittance in block 20 should be adjusted until $C_L$ is equal to 10 micromicrofarads. If this element is not calibrated, then the standard capacitance component $C_s$ should be adjusted to equal 10 micromicrofarads and $C_L$ adjusted until the bridge is balanced, that is, until galvanometers 16 and 17 read zero.

The conductance component $G_L$ of the adjustable complex circuit element in block 20 is similarly adjusted to equal the permissible deviation range set up for it in the requirements.

The two components of standard 5 are then adjusted to read the maximum values of the two admittance components to be measured. Therefore, the capacitance standard $C_s$ is adjusted to read 105 micromicrofarads for the example here used for illustrative purposes.

It must be remembered that the two galvanometers are both connected so that with the switch on the "min." position, they will both give a positive deflection when the two standard components are each less than the corresponding components in the CD arm of the bridge. This may be accomplished by any one of a number of ways. One convenient method is to connect an admittance to the two test terminals 6 having components known to be within the specified ranges. Both galvanometers should then read with a positive deflection for both switch positions. Another method would be to move the ganged switch to its "max." position and with the bridge balanced for a capacitive admittance connected to the test terminals 6, both galvanometers should give a negative deflection when the two standard components of standard 5 are each reduced to values appreciably smaller than the corresponding balance values. If one of the deflections is positive, the connections to that galvanometer should be reversed to make it negative. This, of course, must be done only after the bridge has been given its preliminary balance and the phase control networks $\Phi_R$ and $\Phi_T$ have both been correctly adjusted.

The bridge is now ready for testing a large number of similar admittances which may be successively connected to the bridge terminals 6. For each admittance to be tested the switches should be moved first to their "min." and then to their "max." positions. The galvanometers 16 and 17 will both give positive deflections for an acceptable admittance. Assume, for example, that the conductance component $G_x$ connected to the test terminals 6 is smaller than the minimum specified limits but the capacitance component is within limits. In this case galvanometer 16 would give a negative deflection when the switches are on their "min." position and both galvanometers would give a positive deflection when the switches are on their "max." position.

The description given in connection with Fig. 2 is specific to the application of the invention to an admittance bridge. Referring now to Fig. 3, it will be noted how the same apparatus may be used to make impedance measurements with an impedance bridge. It is, of course, obvious that the invention may be practiced in connection with bridges other than of the comparison type. These particular bridges have been selected for their simplicity in illustrating the invention. In Fig. 3 the adjustable complex circuit element and switch is shown in block 20, the adjustable components themselves being an adjustable limit resistor $R_L$ and adjustable inductance $L_L$. The standard 5 in the AD arm of the bridge is also of the same complex form. The adjustment of this bridge is identical with that for the admittance bridge in Fig. 2. The operation also is identical and further description is believed unnecessary.

It sometimes happens that the limits specified for a particular admittance or impedance are set with a very close tolerance and the permissible range of deviation is so small that it becomes less than the residual admittance or impedance of the adjustable range limit element itself. This is easily overcome by resort to the circuit arrangement shown in Figs. 4, 5 and 6. The use of these circuits is easily understood when it is remembered that the primary requirement of the adjustable complex circuit element is to provide a known change in admittance or impedance when the switch is operated.

Referring now particularly to Fig. 4, it will be quite evident that if the limit capacitance $C_L$ is adjusted so that the capacitance between terminals 21 is the same for each position of the min.-max. switch, there will be no change in capacitance presented to the bridge arm. It will also be evident that since this variable capacitor is capable of very fine adjustment, a very small capacitance change can be introduced by simply adjusting the capacitor $C_L$ by a small amount thereby introducing a small change in capacitance between terminals 21 and thereby presenting this small change in capacitance to the bridge arm. The same is true of the continuously adjustable limit conductance $G_L$. The connection of this complex limit admittance to the bridge is obvious from a comparison of this figure with Fig. 2.

Occasionally production measurements may be made of a large number of air condensers having negligibly small conductances. In this case a conductance limit is more or less unimportant so that the complex limit admittance may comprise essentially only the capacitance component as shown in Fig. 5. Here the adjustments are made by two separate variable capacitors $C_1$ and $C_2$ whereby the capacitance presented for the two positions of the switch may be independently adjusted. Otherwise this circuit arrangement is identical with Fig. 4. If desired, the conductance component may be added to Fig. 5 in the same manner as shown for Fig. 4. The operation of this network is otherwise identical with that described for Fig. 4.

In the arrangement shown for Fig. 6 the adjustable complex limit element is in the form of an impedance and is of particular value in connection with a bridge of the type shown in Fig. 3. In this case the complex components may be adjusted to differ by a small amount, as is required, in just the same manner as was described for the admittance of Fig. 4. The connection of this circuit to the bridge of Fig. 3 is perfectly obvious and no further description is believed necessary.

For illustrative purposes, relatively simple networks have been shown connected to the test terminals 6. For example, in Fig. 2 the admittance was shown as a simple parallel capacitor and conductance and in Fig. 3 the impedance is shown as a simple series-connected resistor and inductor. It is obvious to those skilled in the art that these networks may actually be much more complicated and in the alternative may comprise elements of a different character. For example, in Fig. 2 the admittance element may comprise an inductor in parallel with a capacitor or a resistor or a combination of all three. Similarly in Fig. 3 the impedance may comprise a resistor or inductor in series with a capacitor or any combination of the three. Also more complicated networks having equivalent admittances and impedances may be measured by this invention. Of course, for each type of admittance or impedance to be measured, the bridge must be of a suitable type and the standard as well as the adjustable complex circuit element in block 20 must be selected to suit the equivalent admittance or impedance to be tested.

It is evident from the description of this invention that it provides a means for very rapid testing of large quantities of similar complex circuit elements and that the measurement may be made with ease and minimum fatigue on the part of the operator. In the use of the bridge no complicated adjustments are required, the operation having been reduced to the simple operation of a two-position switch arrangement. It should also be noted that if the adjustable complex circuit element in block 20 is connected across the AD arm instead of the CD arm by moving connection 23 from terminal C to A, the same result is achieved by simply adjusting the standard components to the specified minimum respective values rather than to the maximum values. Of course, if the complex circuit element is in the form of an impedance, the connection 23 may be moved from terminal 3 to terminal 4 in the manner already described and the complex components of the standard impedance are also adjusted to the minimum specified values instead of the maximum values as previously described. The introduction of additional amplifiers in either of the indicator channels or the removal of amplifier 15 are also to be regarded as obvious and well-known modifications within the scope of this invention.

What is claimed is:

1. A system adapted for production testing of complex circuit elements comprising in combination, an alternating current bridge having input and output terminals, said bridge also having a standard arm and an arm including test terminals for connecting a complex circuit element to be tested, a source of alternating current connected to the bridge input terminals, two phase-sensitive bridge balance detectors each having at least one pair of output terminals and two pairs of input terminals, two zero-center-reading indicators, one for connection to one pair of detector output terminals and the other for connection to the other pair of detector output terminals, a reversing switch for each indicator connecting it to the output terminals of its phase detector, circuits connecting one pair of input terminals of each detector to the bridge output terminals, another circuit including phase adjusting means connecting the two pairs of remaining detector input terminals to said source, said phase adjusting means being so constructed and arranged as to supply a voltage to one pair of said terminals substantially in phase with the real component of the bridge output voltage and substantially 90 electrical degrees out of phase with respect to that supplied to said other pair of terminals, an adjustable range limit complex circuit element connected in at least one arm of the bridge, and a switch connected to said adjustable element for changing the magnitude of its components between two predetermined limits.

2. The combination in accordance with claim 1 wherein said phase detectors each include a rectifying means for delivering a direct current output from its output terminals.

3. The combination in accordance with claim 1 wherein said adjustable range limit complex circuit element is additionally independently adjustable as to each of its components.

4. The combination in accordance with claim 1 wherein said switch connected to said adjustable element is ganged with said reversing switches whereby they are simultaneously operated to either of their two positions.

5. A system adapted for production testing of complex circuit elements comprising in combination an alternating current bridge having input and output terminals, said bridge also having a standard arm and an arm including test terminals for connecting a complex circuit element to be tested, a source of alternating current connected to said bridge input terminals, two phase-sensitive bridge balance detectors each having at least one pair of output terminals and two pairs of input terminals, two indicators each comprising a zero-center-reading direct current meter of the D'Arsonval type, one for connection to one pair of detector output terminals and the other for connection to the other pair of detector output terminals, a reversing switch for each indicator connecting it to the output terminals of its phase detector, circuits connecting one pair of input terminals of each detector to the bridge output terminals, another circuit including phase-adjusting means connecting the two pairs of remaining detector input terminals to said source, said phase adjusting means being so constructed and arranged as to supply a voltage to one pair of said terminals substantially in phase with the real component of the bridge output voltage and substantially 90 electrical degrees out of phase with respect to that supplied to said other pair of terminals, an adjustable range limit complex circuit element connected in an arm of the bridge, and a switch connected to said adjustable element for changing the magnitude of its components between two predetermined limits.

6. A system adapted for production testing of complex circuit elements comprising in combination an alternating current bridge having input and output terminals, said bridge also having a standard arm and an arm including test terminals for connecting a complex circuit element to be tested, a source of alternating current connected to the bridge input terminals, two phase-sensitive bridge balance detectors each having at least one pair of output terminals and two pairs of input terminals, two zero-center-reading indicators, one for connection to one pair of detector output terminals and the other for connection to the other pair of detector output terminals, a reversing switch for each indicator connecting it to the output terminals of its phase detector, circuits connecting one pair of input terminals of each detector to the bridge output terminals, another circuit including phase-adjusting means connecting the two pairs of remaining detector input terminals to said source, said phase adjusting means being so constructed and arranged as to supply a voltage to one pair of said terminals substantially in phase with the real component of the bridge output voltage and substantially 90 electrical degrees out of phase with respect to that supplied to said other pair of terminals, an adjustable range limit complex circuit element comprising one adjustable element capable of carrying current substantially in phase with the voltage across it and another adjustable element capable of carrying current substantially in quadrature with the voltage across it, circuits connecting said elements in an arm of the bridge, and a switch connected to said adjustable element for changing the magnitude of its components between two predetermined limits.

7. The combination in accordance with claim 6 wherein said switch connected to said adjustable element is ganged with said reversing switches, whereby they are simultaneously operated to either of their two positions.

BOGUMIL M. WOJCIECHOWSKI.

REFERENCES CITED

The following references are of record in the file of this patent:

UNITED STATES PATENTS

| Number | Name | Date |
|---|---|---|
| 1,324,818 | Hazard | Dec. 16, 1919 |
| 1,660,405 | Affel | Feb. 28, 1928 |
| 1,951,461 | Wilson | Mar. 20, 1934 |
| 2,130,865 | Watts et al. | Sept. 20, 1938 |
| 2,470,412 | Piety | May 17, 1949 |
| 2,474,692 | Rossoff | June 28, 1949 |
| 2,479,051 | Sunstein | Aug. 16, 1949 |